(12) United States Patent
Lanham et al.

(10) Patent No.: US 9,952,077 B2
(45) Date of Patent: Apr. 24, 2018

(54) SELF-ALIGNING BRACE BAR

(71) Applicant: Micro Motion, Inc., Boulder, CO (US)

(72) Inventors: Gregory Treat Lanham, Longmont, CO (US); Christopher A. Werbach, Longmont, CO (US)

(73) Assignee: Micron Motion, Inc., Boulder, CO (US)

( * ) Notice: Subject to any disclaimer, the term of this patent is extended or adjusted under 35 U.S.C. 154(b) by 63 days.

(21) Appl. No.: 14/781,191

(22) PCT Filed: Apr. 3, 2014

(86) PCT No.: PCT/US2014/032852
§ 371 (c)(1),
(2) Date: Sep. 29, 2015

(87) PCT Pub. No.: WO2014/172115
PCT Pub. Date: Oct. 23, 2014

(65) Prior Publication Data
US 2016/0069719 A1     Mar. 10, 2016

Related U.S. Application Data

(60) Provisional application No. 61/813,260, filed on Apr. 18, 2013.

(51) Int. Cl.
*G01F 1/84* (2006.01)
*G01F 1/66* (2006.01)
(Continued)

(52) U.S. Cl.
CPC .............. *G01F 1/662* (2013.01); *F16L 3/222* (2013.01); *G01F 1/8409* (2013.01);
(Continued)

(58) Field of Classification Search
CPC .... G01F 1/8413; G01F 1/8409; G01F 1/8418; G01F 1/8477; G01F 15/185; G01F 1/662; F16L 3/221; F16L 3/222; F16L 3/237
See application file for complete search history.

(56) References Cited

U.S. PATENT DOCUMENTS 4,991,801 A * 2/1991 Trumbull ............... F16L 3/13
248/62
5,370,002 A    12/1994 Normen
(Continued)

OTHER PUBLICATIONS

Youde Xiong: "Formulaire de mecanique Pieces de constructions", Jan. 1, 2007 (Jan. 1, 2007), pp. 3-37, XP055128350, ISBN: 978-2-21-212045-5 Retrieved from the Internet: www.eyrolles.com/Chanpitres/9782212120455/Chapl Xion.pdf.

*Primary Examiner* — Justin Olamit
(74) *Attorney, Agent, or Firm* — The Ollila Law Group LLC (57) ABSTRACT

A brace bar, a flow conduit assembly including a brace bar, and a method for assembling a vibrating flowmeter including a brace bar are provided. The brace bar includes a first brace bar plate and a second brace bar plate. The first brace bar plate includes a first aperture and a first notch. The second brace bar plate includes a second aperture and a second notch. The first aperture and the second notch are configured to couple to a first flow conduit. The second aperture and the first notch are configured to couple to a second flow conduit.

20 Claims, 5 Drawing Sheets (51) Int. Cl.
*F16L 3/22* (2006.01)
*G01F 15/18* (2006.01)
(52) U.S. Cl.
CPC .......... *G01F 1/8413* (2013.01); *G01F 1/8477* (2013.01); *G01F 15/185* (2013.01)

(56) References Cited

U.S. PATENT DOCUMENTS

| | | | |
|---|---|---|---|
| 5,996,225 A * | 12/1999 | Ollila | G01F 1/8404 29/888.09 |
| 6,415,668 B1 | 7/2002 | Cage | |
| 6,782,762 B2 | 8/2004 | Cage | |
| 7,275,449 B2 | 10/2007 | Hussain et al. | |
| 2004/0045371 A1 | 3/2004 | Cage | |

* cited by examiner

PRIOR ART

SELF-ALIGNING BRACE BAR

TECHNICAL FIELD

The present Application relates to brace bars, and more particularly, to a self-aligning brace bar.

BACKGROUND OF THE APPLICATION

Vibrating flowmeters, such as, for example, densitometers and Coriolis sensors, are used for measuring a characteristic of flowing substances. For example, a vibrating flowmeter may measure a density, mass flow rate, volume flow rate, totalized mass flow, temperature, or any other information with regards to a fluid. Vibrating flowmeters include one or more flow conduits, which may have a variety of shapes, such as, for example, straight, U-shaped, or irregular configurations. The one or more flow conduits have a set of natural vibration modes, including, for example, simple bending, torsional, radial, and coupled modes. The one or more flow conduits are vibrated by at least one drive at a resonance frequency in one of these modes for purposes of determining a characteristic of the flowing substance.

Figure 1:
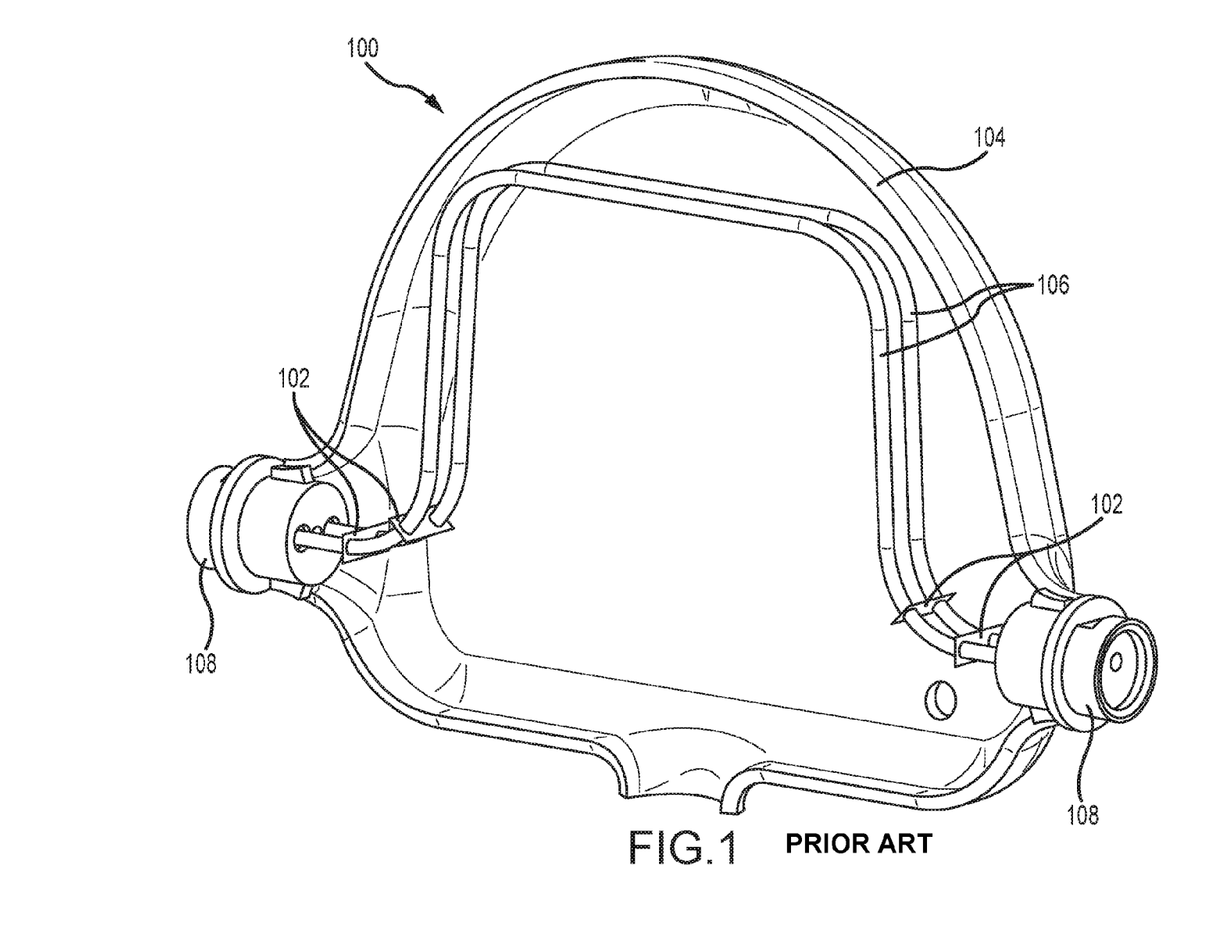
FIG. 1 depicts a cut-away view of a vibrating flowmeter 100 including a brace bar using a prior design.

FIG. 1 depicts a cut-away view of an example vibrating flowmeter 100. For example, vibrating flowmeter 100 may be a Coriolis flowmeter or sensor. Vibrating flowmeter 100 includes four brace bars 102, a case 104, two flow conduits 106, and two manifolds 108. In the embodiment of vibrating flowmeter 100, the two flow conduits 106 each include four bends to form a U-shaped configuration. Manifolds 108 couple flow conduits 106 to the case 104 at the inlet and outlet of the vibrating flowmeter 100. Brace bars 102 couple the flow conduits 106 to one another.

Vibrating flowmeter 100 further includes one or more electronics that transmit a sinusoidal drive signal to a drive (not shown), which is typically a magnet/coil combination with the magnet typically being affixed to the one of the flow conduits 106 and with the coil typically being affixed to a supporting structure or to a second of the flow conduits 106. The drive signal causes the drive to vibrate the flow conduits 106 at a resonance frequency in one of the natural modes of the flow conduits 106. For example, the drive signal may be a periodic electrical current transmitted to the coil.

Vibrating flowmeter 100 may include at least one pick-off (not shown) that detects the motion of a flow conduit and generates a sinusoidal pick-off signal representative of the motion. The pick-off signal is transmitted to the one or more electronics, which, according to well-known principles, determines a characteristic of the flowing substance or adjusts the drive signal, if necessary.

A vibrating flowmeter may include brace bars 102 that connect two flow conduits 106 together. Vibrating flowmeters typically include one or more brace bars towards the inlet or outlet of a meter. In the embodiment of vibrating flowmeter 100, four brace bars 102 are positioned symmetrically on flow conduits 106. Two brace bars 102 are positioned between a manifold 108 and a first bend at each of an inlet and an outlet end of vibrating flowmeter 100. Brace bar 102 allows for separation between a natural frequency of the flow conduits 106, or a frequency at which the flow conduits are typically driven to determine a characteristic of a flowing substance, and modes of vibration found in other components of the meter. Accordingly, by varying the number and position of brace bars 102, the frequency at which the various modes of vibration will be induced in vibrating flowmeter 100 may be somewhat controlled. Furthermore, it may also be desirous to use brace bars 102 to reduce stress on the flow conduits 106 as they oscillate, particularly to reduce stress on the connecting area between a manifold or flange found at the inlet or outlet and the flow conduits 106.

Figure 2:
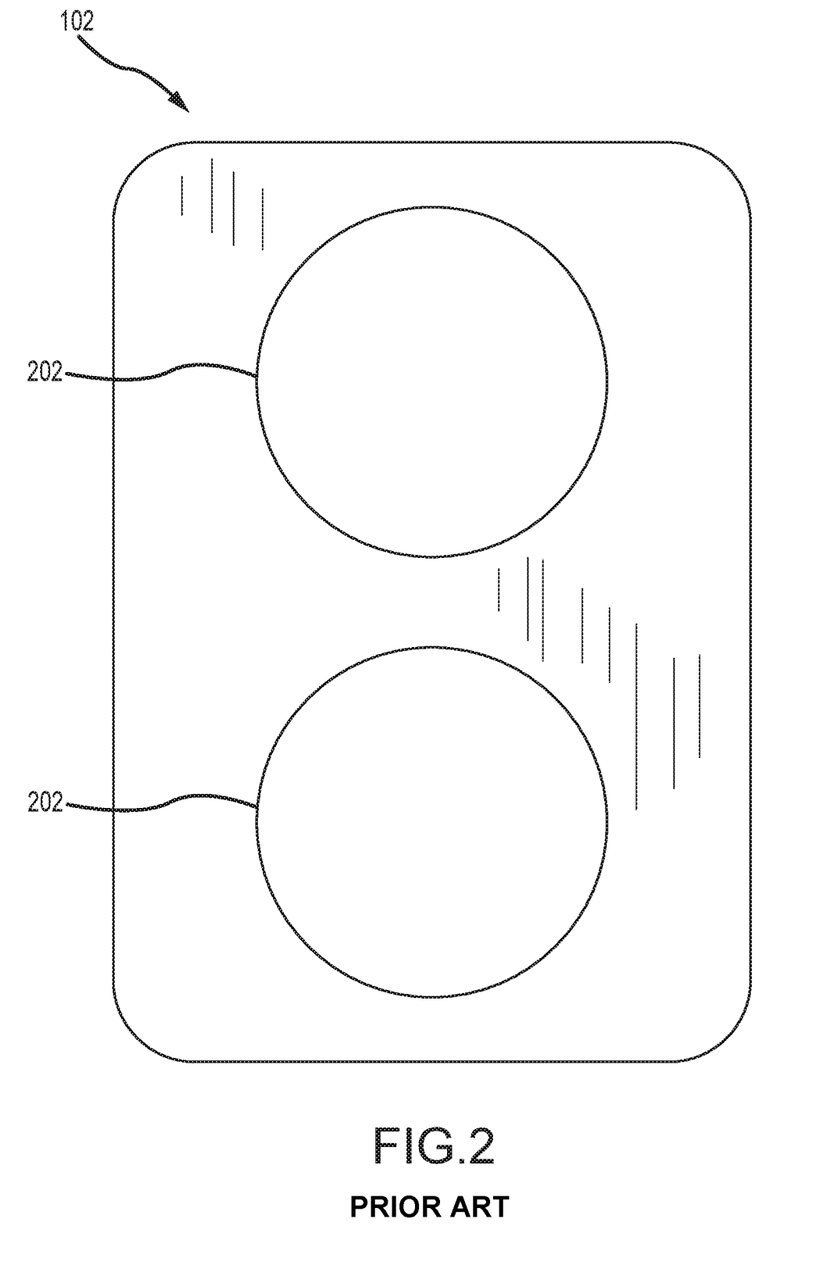
FIG. 2 depicts a top view of a one-piece brace bar 102 using an existing design.

FIG. 2 depicts a top view of brace bar 102. As may be seen from FIG. 2, each brace bar 102 includes two apertures 202 for receiving two flow conduits 106 that may be passed through each of the apertures 202. Brace bar 102 allows two conduits 106 to be connected into a single vibrating structure. However, in order for a brace bar to be effective in this capacity, it is critical that that brace bar maintain a proper alignment.

Vibrating flowmeters are typically built with one of three styles of brace bars. The first type of brace bar is the one-piece brace bar 102 depicted in FIGS. 1 and 2. Brace bar 102 may be used with flow conduit geometries that permit the brace bars to slide over the flow conduits into position. In the example of vibrating flowmeter 100, it may be seen that flow conduits 106 are substantially circular and uniform in cross-section. Flow conduits 106 are also shaped with the same respective bends so that they are positioned substantially equidistant to one another along their respective lengths. The design of brace bar 102 provides for easy manufacturing. The excellent alignment of brace bar 102 also provides for reliable positioning of flow conduits 106. Assembling a vibrating flowmeter with brace bars 102 may present a challenge, however.

Figure 3:
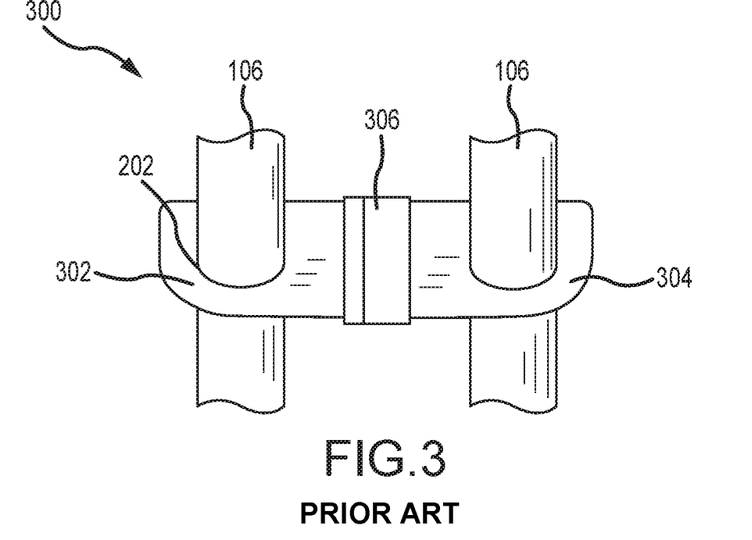
FIG. 3 depicts a 3-D view of a two-piece brace bar 300 using an existing design.

The second style of brace bar typically used in vibratory flowmeters is the two-piece brace bar 300 depicted in FIG. 3. Brace bar 300 includes two brace bar sections 302 and 304, with a joint 306 between the brace bar sections. Each brace bar section 302 and 304 includes a respective aperture 202 for a respective flow conduit 106. To assemble brace bar 300, a flow conduit 106 is passed through each of brace bar sections 302 and 304. Brace bar sections 302 and 304 are subsequently joined at joint 306. Brace bar 300 may provide for an easier assembly, but it presents a new problem with regards to alignment.

Figure 4:
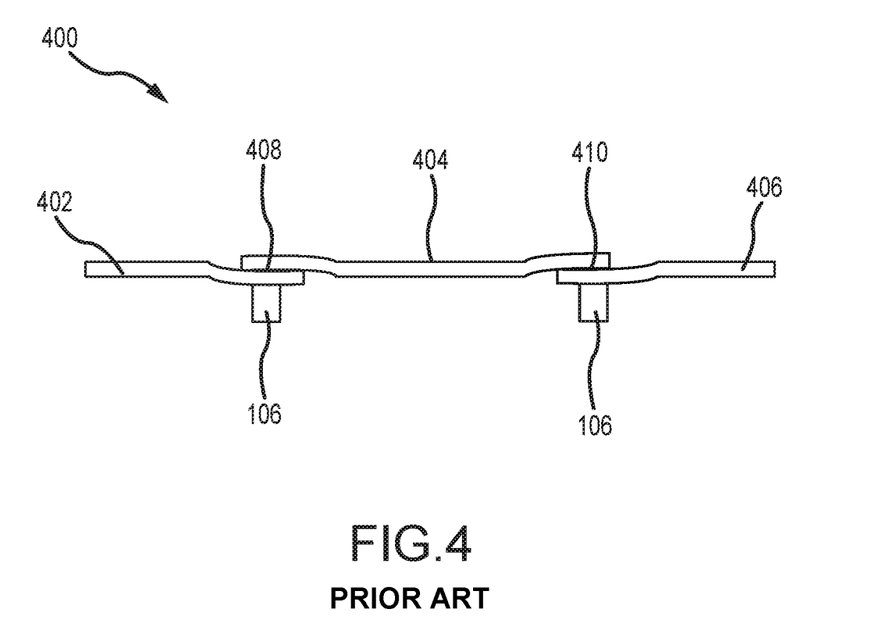
FIG. 4 depicts a 3-D view of a three-piece brace bar 400 using an existing design.

A third style of brace bar typically used in Coriolis sensors is the three-piece brace bar 400 depicted in FIG. 4. Brace bar 400 includes three sections 402, 404, 406 and two joints 408 and 410. Brace bar 400 may be assembled by inserting a flow conduit 106 into each of sections 402 and 406. Section 404 may then be coupled between sections 402 and 406 via joints 408 and 410. The three-piece design of brace bar 400 may provide for further ease of assembly, but it includes additional joints that may give rise to extra alignment issues.

What is needed is a brace bar that is easy to manufacture, easy to assemble and maintains a proper alignment.

SUMMARY OF THE APPLICATION

A brace bar is provided according to an embodiment of the Application. The brace bar comprises a first brace bar plate including a first aperture and a first notch. The brace bar further comprises a second brace bar plate having a second aperture and a second notch. The first aperture and the second notch are configured to couple to a first flow conduit. The second aperture and the first notch are configured to couple to a second flow conduit.

A flow conduit assembly is provided according to an embodiment of the Application. The flow conduit assembly comprises at least one flow conduit and a brace bar. The brace bar further comprises a first brace bar plate including a first aperture and a first notch. The brace bar further comprises a second brace bar plate having a second aperture and a second notch. The first aperture and the second notch are configured to couple to a first flow conduit. The second aperture and the first notch are configured to couple to a second flow conduit.

A method for assembling a vibrating flowmeter is provided according to an embodiment of the Application. The vibrating flowmeter includes a first flow conduit, a second flow conduit, and a brace bar. The brace bar includes a first brace bar plate and a second brace bar plate. The first brace bar plate includes a first aperture and a first notch. The second brace bar plate includes a second aperture and a second notch. The method comprises the step of sliding the first aperture of the first brace bar plate onto the first flow conduit. The method further comprises the step of sliding the second aperture of the second brace bar plate onto the second flow conduit. The method further comprises the step of seating the first notch onto the second conduit. The method further comprises the step of seating the second notch onto the first conduit.

Aspects

In one embodiment of the brace bar, the first brace bar plate and the second brace bar plate are identical.

In one embodiment of the brace bar, the first brace bar plate and the second brace bar plate are substantially rectangular in shape.

In one embodiment of the brace bar, the first aperture and the second aperture are substantially circular.

In one embodiment of the brace bar, the first notch and the second notch are formed as a segment of a circle.

In one embodiment of the brace bar, the first notch and the second notch are sized to reduce wicking during brazing and to provide alignment of the brace bar.

In one embodiment of the flow conduit assembly, the first brace bar plate and the second brace bar plate are identical.

In one embodiment of the flow conduit assembly, the first brace bar plate and the second brace bar plate are substantially rectangular in shape.

In one embodiment of the flow conduit assembly, the first aperture and the second aperture are substantially circular.

In one embodiment of the flow conduit assembly, the first notch and the second notch are formed as a segment of a circle.

In one embodiment of the flow conduit assembly, the first notch and the second notch are sized to reduce wicking during brazing and to provide alignment of the brace bar.

In one embodiment of the method, positioning the first notch onto the second flow conduit and positioning the second notch onto the first flow conduit includes moving the first flow conduit and the second flow conduit together until the first notch is seated on the first flow conduit and the second notch is seated on the second conduit.

In one embodiment of the method, the method comprises the step of brazing the first flow conduit to the first aperture and the second notch.

In one embodiment of the method, the method comprises the step of positioning a filler in the first aperture opposite the second notch.

In one embodiment of the method, the first notch and the second notch are sized to reduce wicking during brazing and to provide alignment of the brace bar.

In one embodiment of the method, the method comprises the step of brazing the first brace bar plate to the second brace bar plate.

DETAILED DESCRIPTION OF THE APPLICATION

Figure 5:
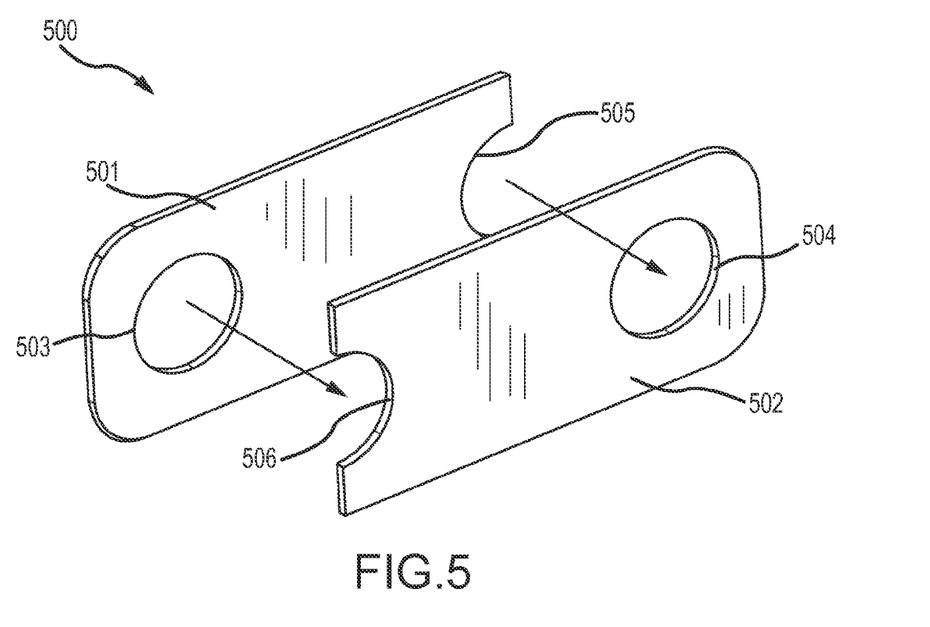
FIG. 5 depicts an exploded view of a brace bar 500 in accordance with an embodiment of the Application.
Figure 6:
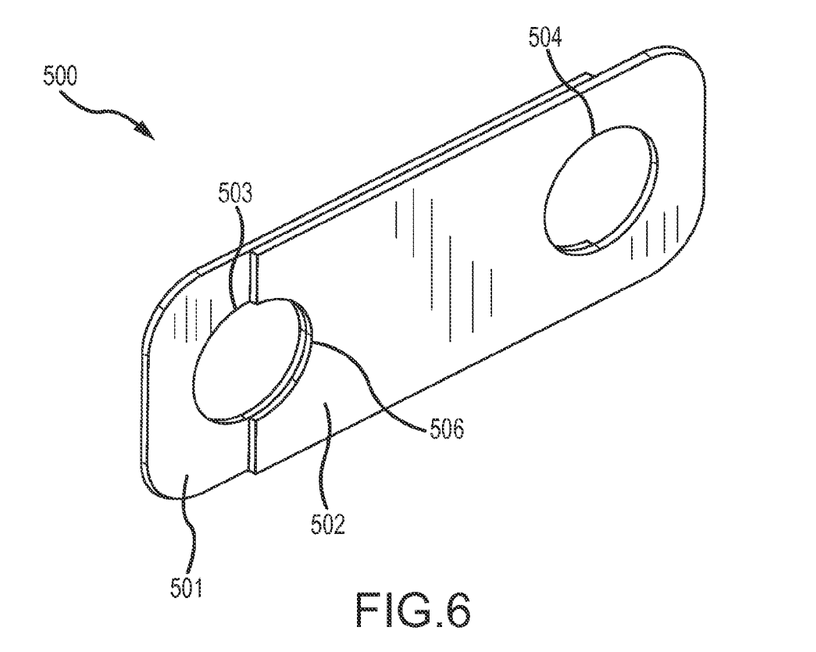
FIG. 6 depicts a profile view of a brace bar 500 in accordance with an embodiment of the Application.
Figure 7:
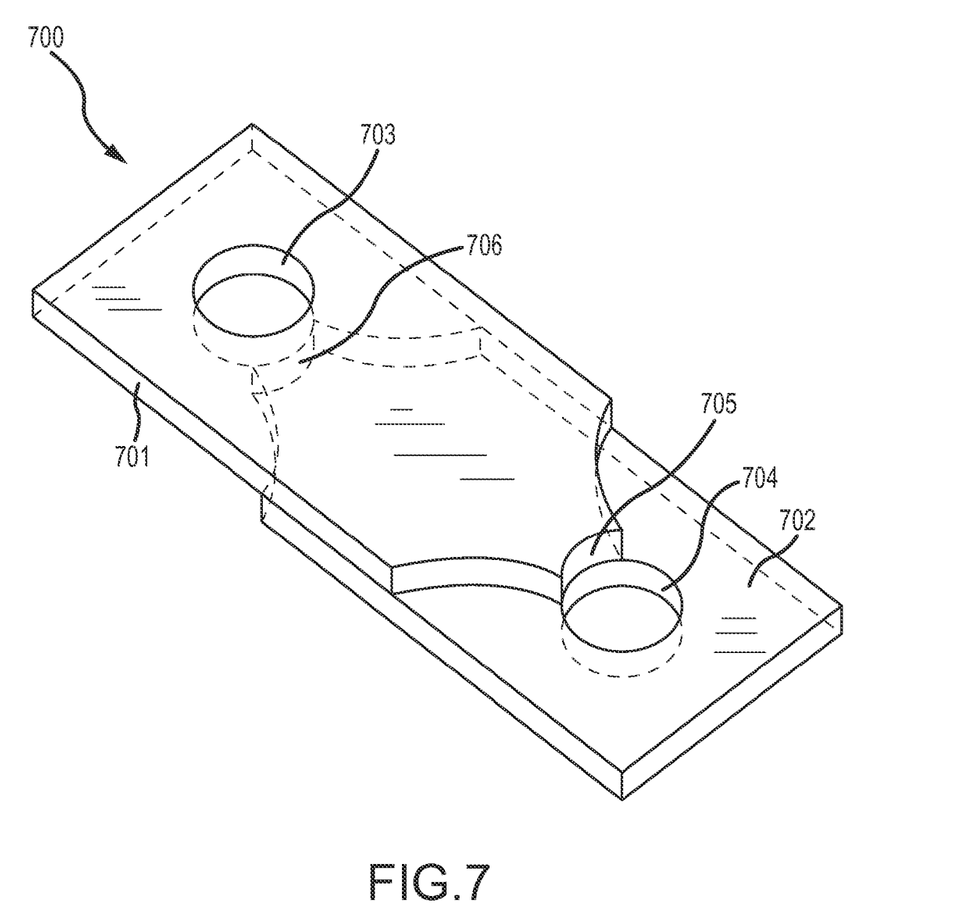
FIG. 7 depicts a 3-D view of a brace bar 700 in accordance with an embodiment of the Application.

FIG. 5-7 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below may be combined in various ways to form multiple variations of the Application. As a result, the Application is not limited to the specific examples described below, but only by the claims and their equivalents.

FIG. 5 depicts an exploded view of brace bar 500, and FIG. 6 depicts a profile view of brace bar 500 according to an embodiment of the Application. The brace bar 500 includes brace bar plates 501 and 502, apertures 503 and 504, and notches 505 and 506. Brace bar 500 is substantially flat and rectangular with rounded corners. Brace bar plates 501 and 502 are also substantially flat. In embodiments, brace bar plates 501 and 502 may be fabricated from a metal suitable for brazing. In other embodiments, brace bar plates 501 and 502 may be fabricated from any material suitable to isolate modes of vibration, reduce stress, or provide stability in a vibrating flowmeter assembly, as commonly known to those who are skilled in the art. Brace bar plate 501 includes aperture 503, and brace bar plate 502 includes aperture 504. Apertures 503 and 504 are each formed to retain a respective flow conduit (not shown). In embodiments, apertures 503 and 504 may be formed to substantially match a cross section of a flow conduit inserted therein. In the embodiment of FIGS. 5 and 6, apertures 503 and 504 are substantially circular to conform to circular flow conduits. This is not intended to be limiting, however. In embodiments apertures 503 and 504 may be oval, rectangular, or any other cross sectional shape. Apertures 503 and 504 of brace bar plates 501 and 502 are each inserted with a respective flow conduit during the assembly of the vibratory flowmeter.

Brace bar plate 501 further includes notch 505, and brace bar plate 502 further includes notch 506. Notches 505 and 506 enable the alignment of brace bar plates 501 and 502 by providing an indention, a cutout, or a self-location feature on the perimeter of the brace bar plate that may be used to seat a respective brace bar plate against a flow conduit opposite the flow conduit which the respective brace bar plate is coupled to via its aperture. For example, brace bar plate 501 is coupled to a first flow conduit via aperture 503 and is seated against a second flow conduit via notch 505. Brace bar plate 502 is coupled to a second flow conduit via aperture 504 and is seated against a first flow conduit via notch 506.

Notches 505 and 506 may be any shape or form that allows brace bar plates 501 or 502 to securely self-align against an opposing flow conduit. The shape of notches 505 and 506 may furthermore prevent brace bar plates 501 and 502 from becoming dislodged once brace bar 500 is assembled in a vibratory flowmeter. In the embodiment of FIGS. 5 and 6, notches 505 and 506 are identical half-circles cut into the substantially rectangular perimeter of brace bar plates 501 and 502. The semi-circular notches 505 and 506 may secure brace bar plates 501 and 502 against flow conduits with circular cross-sections such as flow conduits 106. Notches 505 and 506 depicted in the example of brace bar 500 are not intended to be limiting, however. Non-circular segment notch shapes are also contemplated by this Application. In addition, a brace bar with non-identical notches is also contemplated by this Application.

Once each brace bar plate 501 and 502 is slid onto a respective flow conduit, the brace bar plates 501 and 502 may be rotated so that notches 505 and 506 each face an opposing flow conduit. The flow conduits may then be moved together so that notches 505 and 506 become seated upon, or otherwise make contact with, an opposing flow conduit, locking each respective brace bar plate 501 and 502 into place. Once notches 505 and 506 are seated on opposing flow conduits, they may be prevented from rotating or otherwise moving, thereby providing a stable alignment for brace bar 500.

FIG. 6 depicts a fully assembled brace bar 500. As may be seen, aperture 503 and notch 506 are co-aligned to form a first overlapping segment. Aperture 504 and notch 505 are also co-aligned to form a second overlapping section.

Once brace bar 500 is assembled as depicted in FIG. 6, brace bar plates 501 and 502 may be coupled together to provide for a more stable brace bar. Brace bar plates 501 and 502 may be brazed in the area where they overlap between apertures 503 and 504 when assembled. Typically, the method of joining the two brace bar plates 501 and 502 together will depend on the particular material used for the brace bar 500. In embodiments, brace bar plates 501 and 502 may be joined by placing a filler material, for example a brazing paste, between the brace bar plates and brazing the brace bar plates together. In other embodiments, brace bar plates 501 and 502 may be joined using any other adhesion method commonly known to those in the art, including but not limited to soldering, welding, bonding, gluing, or fastening the plates together. In embodiments, brace bar plates 501 and 502 may be further coupled to the flow conduits to provide for a more stable flowmeter assembly. Brace bar plates 501 and 502 may be coupled by bonding, soldering, gluing, welding, or by using any other known method for attaching two elements together. The particular method of coupling will typically depend on the material used for the flow conduits 106 and the brace bar plates 501 and 502.

In embodiments, a joint between the brace bar plates 501 and 502 and a flow conduit may be brazed together. Ideally, once brazed the filler will uniformly surround the perimeter of each flow conduit to securely couple each flow conduit to each brace bar plate 501 and 502. Brazing the joints between brace bar plates 501 and 502 and a flow conduit may be problematic, however, due to the potential for wicking of filler from the joints between the brace bar plates 501 and 502 and conduit into the joint between brace bar plates 501 and 502. In particular, filler may be wicked away via the overlapping segments, or wicking areas found between aperture 503 and notch 506, and aperture 504 and notch 505. In embodiments, the wicking areas for a brace bar may be reduced to diminish the possibility of wicking between the brace bar plates 501 and 502 and a flow conduit during brazing. For example, brace bar 700 includes brace bar plates 701 and 702, a three-dimensional view of which is provided in FIG. 7. Brace bar plate 701 includes aperture 703 and notch 705. Brace bar plate 702 includes aperture 704 and notch 706. Brace bar 700 is substantially rectangular and flat. In FIG. 7, it may be seen that brace bar plates 701 and 702 are substantially flat and include a bottle-like shaped perimeter. Notches 705 and 706 comprise the top of the bottle-like shape of each respective brace bar plate. A concave taper connects notches 705 and 706 to a substantially rectangular lower portion of the bottle-like shape of brace bar plates 701 and 702. The concavity of the taper and the narrow angle to which the tapering subtends away from the notches 705 and 706 reduces the surface area of the area overlapped by brace bars 701 and 702 in the region immediately adjacent to the notch. Reducing the surface area where brace bars 701 and 702 overlap may further reduce the wicking of filler away from the conduit joints during brazing. In other embodiments, the taper may be straight, convex, or any other shape.

It may be seen that notch 705 co-aligns with aperture 704 to create a first overlapping segment, and notch 706 co-aligns with aperture 703 to create a second overlapping segment of brace bar 700. The overlapping segments of brace bar 700 are proportionately smaller than the corresponding overlapping segments of brace bar 500. Reducing the overlapping segments of brace bar 700 may further decrease the wicking of filler away from the flow conduit/aperture/notch joints of brace bar 700 into the space between brace bar plates 701 and 702 during a brazing procedure. In embodiments, notches 705 and 706 may be sized such that they cover a segment of apertures 703 and 704 that is small enough to reduce wicking, but large enough to maintain robust alignment of brace bar 700.

Brace bars 500 and 700 are shown to be substantially rectangular in shape, brace bar 500 further including rounded corners. The Application is not limited to these embodiments, however. Other shapes of brace bar plate are contemplated, including but not limited to circular, oval, diamond, or irregular. Similarly, while the example embodiments of brace bar plates 501, 502, 701, and 702 are represented as substantially flat, non-flat brace bar plate embodiments are also contemplated by this Application. Although the pairs of brace bar plates 501 and 502 and 701 and 702 are represented as identical in the examples of brace bars 500 and 700, in embodiments a brace bar may be composed of dissimilar brace bar plates.

The detailed descriptions of the above embodiments are not exhaustive descriptions of all embodiments contemplated by the inventors to be within the scope of the Application. Indeed, persons skilled in the art will recognize that certain elements of the above-described embodiments may variously be combined or eliminated to create further embodiments, and such further embodiments fall within the scope and teachings of the Application. It will also be apparent to those of ordinary skill in the art that the above-described embodiments may be combined in whole or in part to create additional embodiments within the scope and teachings of the Application.

Thus, although specific embodiments of, and examples for, the Application are described herein for illustrative purposes, various equivalent modifications are possible within the scope of the Application, as those skilled in the relevant art will recognize. The teachings provided herein may be applied to other brace bars, and not just to the embodiments described above and shown in the accompanying figures. Accordingly, the scope of the Application should be determined from the following claims.

We claim:

1. A brace bar (500), comprising:
   a first brace bar plate (501) comprising a first aperture (503) and a first notch (505); and
   a second brace bar plate (502) comprising a second aperture (504) and a second notch (506); and
   wherein the brace bar further comprises a configuration wherein the first aperture (503) and the second notch (506) are sized and dimensioned to couple to a first flow conduit, and the second aperture (504) and the first notch (505) are sized and dimensioned to couple to a second flow conduit, wherein the first aperture comprises a radius being substantially equal to a radius comprised by the second notch, and the second aperture comprises a radius being substantially equal to a radius of the first notch.

2. The brace bar (500) of claim 1, wherein the first brace bar plate (501) and the second brace bar plate (502) have the same size and dimension.

3. The brace bar (500) of claim 1, the first brace bar plate (501) and the second brace bar plate (502) are substantially rectangular in shape.

4. The brace bar (500) of claim 1, wherein the first aperture (503) and the second aperture (504) are substantially circular.

5. The brace bar (500) of claim 1, wherein the first notch (505) and the second notch (506) are formed as a segment of a circle.

6. The brace bar (500) of claim 1, further comprising braze filler material between the first brace bar plate and the second brace bar plate, wherein the first notch (505) and the second notch (506) are sized to reduce wicking during brazing and to provide alignment of the brace bar (500).

7. A flow conduit assembly, including:
   a first flow conduit (106), a second flow conduit (106), and a brace bar (500), wherein the brace bar (500) comprises:
   a brace bar (500), comprising of a first brace bar plate and a second brace bar plate, wherein the first brace bar plate (501) comprises a first aperture (503) and a first notch (505); and
   the second brace bar plate (502) comprises a second aperture (504) and a second notch (506);
   wherein the first aperture (503) and the second notch (506) are sized and dimensioned to couple to the first flow conduit (106), and the second aperture (504) and the first notch (505) are sized and dimensioned to couple to the second flow conduit (106), wherein the first aperture comprises a radius being substantially equal to a radius comprised by the second notch, and the second aperture comprises a radius being substantially equal to a radius of the first notch.

8. The flow conduit assembly of claim 7, wherein the first brace bar plate (501) and the second brace bar plate (502) have the same size and dimension.

9. The flow conduit assembly of claim 7, the first brace bar plate (501) and the second brace bar plate (502) are substantially rectangular in shape.

10. The flow conduit assembly of claim 7, wherein the first aperture (503) and the second aperture (504) are substantially circular.

11. The flow conduit assembly of claim 7, wherein the first notch (505) and the second notch (506) are formed as a segment of a circle.

12. The flow conduit assembly of claim 7, further comprising braze filler material between the first brace bar plate and the second brace bar plate, wherein the first notch (505) and the second notch (506) are sized to reduce wicking during brazing and to provide alignment of the brace bar (500).

13. A method for assembling a vibrating flowmeter including a first flow conduit (106), a second flow conduit (106), a brace bar (500) including a first brace bar plate (501) having a first aperture (503) and a first notch (505) and a second brace bar plate (502) having a second aperture (504) and a second notch (506), the method comprises the following steps:
   sliding the first aperture (503) of the first brace bar plate (501) onto the first flow conduit (106);
   sliding the second aperture (504) of the second brace bar plate (502) onto the second flow conduit (106);
   seating the first notch (505) onto the second conduit (106); and
   seating the second notch (506) onto the first conduit (106).

14. The method of claim 13, wherein seating the first notch (505) onto the second flow conduit (106) and seating the second notch (506) onto the first flow conduit (106) includes rotating the first brace bar plate (501) until the first notch (505) is aligned with the second conduit (106) and rotating the second brace bar plate (502) until the second notch (506) is aligned with the first conduit (106).

15. The method of claim 13, wherein positioning the first notch (505) onto the second flow conduit (106) and positioning the second notch (506) onto the first flow conduit (106) includes moving the first flow conduit (106) and the second flow conduit (106) together until the first notch (505) is seated on the second flow conduit (106) and the second notch (506) is seated on the first conduit (106).

16. The method of claim 13, further comprising the steps of:
   brazing the first flow conduit (106) to the first aperture (503) and the second notch (506).

17. The method of claim 16, further comprising the step of:
   positioning a filler in the first aperture (503) opposite the second notch (506).

18. The method of claim 16, wherein the first notch (505) and the second notch (506) are sized to reduce wicking during brazing and to provide alignment of the brace bar (500).

19. The method of claim 16, further comprising the steps of:
   brazing the first brace bar plate (501) to the second brace bar plate (502).

20. The method of claim 13, wherein the first notch (505) and the second notch (506) are formed as a segment of a circle.

* * * * *

UNITED STATES PATENT AND TRADEMARK OFFICE
CERTIFICATE OF CORRECTION

PATENT NO. : 9,952,077 B2  
APPLICATION NO. : 14/781191  
DATED : April 24, 2018  
INVENTOR(S) : Gregory Treat Lanham et al.

It is certified that error appears in the above-identified patent and that said Letters Patent is hereby corrected as shown below:

(73) Assignee: replace "Micron Motion, Inc." with --Micro Motion, Inc.--

Signed and Sealed this  
Tenth Day of July, 2018

Andrei Iancu  
*Director of the United States Patent and Trademark Office*